United States Patent

Heshmat

[11] Patent Number: 5,205,384
[45] Date of Patent: Apr. 27, 1993

[54] POWDER-LUBRICATED DAMPER WITH WAVY DAMPER PADS

[75] Inventor: Hooshang Heshmat, Niskayuna, N.Y.

[73] Assignee: Mechanical Technology Incorporated, Latham, N.Y.

[21] Appl. No.: 601,304

[22] Filed: Oct. 22, 1990

[51] Int. Cl.⁵ .................... F16D 65/78; F16D 55/00
[52] U.S. Cl. ................ 188/264 B; 188/264 E; 188/71.1; 188/71.5; 384/99; 384/535; 384/581; 384/406
[58] Field of Search .............. 188/166, 264 R, 264 B, 188/264 CC, 83, 268, 71.6, 71.1, 71.5, 73.1, 73.2, 72.1, 279, 293, 296, 381, 264 E; 384/99, 535, 581, 124, 406

[56] References Cited

U.S. PATENT DOCUMENTS

| | | | |
|---|---|---|---|
| 2,214,104 | 9/1940 | Hildabolt et al. | 188/264 B |
| 2,301,756 | 11/1942 | Shutt | 188/264 B |
| 3,366,211 | 1/1968 | May | 188/264 E |
| 3,907,073 | 9/1975 | Harrison | 188/264 E X |
| 4,027,755 | 6/1977 | Evans et al. | 188/264 E X |
| 4,028,973 | 6/1977 | Bogdanski et al. | 188/268 X |
| 4,088,078 | 6/1978 | Noble | 188/71.1 X |
| 4,296,976 | 10/1987 | Heshmat | 384/99 |
| 4,379,066 | 4/1983 | Small, Jr. | 188/264 E X |
| 4,483,422 | 11/1984 | Cory | 188/71.5 |
| 4,503,952 | 3/1985 | Hesse | 188/296 X |
| 4,694,530 | 9/1987 | Foggini | 188/290 X |

FOREIGN PATENT DOCUMENTS

| | | | |
|---|---|---|---|
| 2611078 | 9/1977 | Fed. Rep. of Germany | 188/73.1 |
| 0171918 | 11/1956 | Sweden | 188/71.5 |
| 1222931 | 4/1986 | U.S.S.R. | 188/296 |
| 1395866 | 5/1988 | U.S.S.R. | 188/381 |

Primary Examiner—Robert J. Oberleitner
Assistant Examiner—Josie A. Ballato
Attorney, Agent, or Firm—Kane, Dalsimer, Sullivan, Kurucz, Levy, Eisele and Richard

[57] ABSTRACT

The damper arrangement is operated in high temperature applications, such as load and speed environments such as found in turboengines. The damper arrangement includes damper pads which are laterally urged against damping elements forming a shearing zone therebetween. The shearing zone is lubricated with solid dry powder lubricant. The damper pads include a circumferential wave or a multi-partial arc configuration formed by radial slots with inwardly tapering radial bevels and lateral bevels adjacent to the radial slots to enhance the circulation of the powder lubricant in response to nutating motion between the damper pad and the damper element.

8 Claims, 3 Drawing Sheets

1

POWDER-LUBRICATED DAMPER WITH WAVY DAMPER PADS

FIELD OF INVENTION

This invention relates to a powder-lubricated damper arrangement.

DESCRIPTION OF THE PRIOR ART

Recent advances in turboengine initiatives aimed at achieving a revolutionary improvement by doubling propulsion capability have led to an increased need for solid lubricated bearing and damper technology. Achieving this improvement in performance requires that engine bearings and bearing dampers are subjected to increased temperatures, loads and speeds.

Accordingly, the combined goals of improving performance and reducing size create a severe operating environment for bearings and bearing dampers. Further, the severity of this environment precludes the use, at high temperatures, of conventional liquid hydrocarbon-based lubricants. Temperatures for bearing and bearing dampers are expected to exceed 1000° F. and may reach levels as high as 1500° F.

Promising results have been obtained at reasonably moderate temperatures with frictional or coulomb damping as shown by U.S. Pat. No. 4,277,113 issued on Jul. 7, 1981 to Heshmat, entitled "Composite Material Compliant Bearing Element". However, the wear life of the apparatus of this reference would probably be marginal for a high temperature and high load application. In addition, those materials exhibiting a high coefficient of friction at low ambient temperatures often produce high wear rates and are prone to oxidation and loss of friction damping at a higher temperatures.

Further, it has been discovered that certain quasihydrodynamic effects are well suited to the applications in damper and bearing damper technology. A hydrodynamic effect is produced in a lubricant by the relative motion of the surfaces. As noted in the paper "On a Common Tribological Mechanism Between Interacting Surfaces" by H. Heshmat, O. Pinkus and M. Godet, wear particles produced by the sliding process can be viewed as a lubricant and since wear accompanies all dry sliding, there is always a lubricant present in tribological processes. Thus, it is the presence of wear and the ability of wear particles to act as lubricating agents that form the basis for imputing quasihydrodynamic effects to processes outside the regime of classical hydrodynamic lubrication.

SUMMARY AND OBJECTS OF THE INVENTION

It is therefore an object of this invention to provide a damper which is designed for high temperatures, loads and speeds.

It is therefore an object of this invention to provide a damper which is powder-lubricated.

These and other objects are provided by a damper design including a pair of damper elements that are loaded axially against a nutating damper pads by pneumatic pressure through a compliant mount or via other means of loading such as spring type devices The pressurized powder carrier gas produces a normal load on the damper pad while the powder is transported to the damper entrance region at the inner diameter of the damper pads. Each damper pad is secured radially by a piston ring and circumferentially by a compliant seal. The contacting surfaces of the damper pads are designed to have a radially converging wedge-shaped cross section and a circumferential wave. The converging regions on the damper pads enhance the powder flow, causing the formation of a powder film that separates the mating surfaces, which is analogous to the mechanical face seal operation. The damper pads are wedge shaped in the radial direction to enhance the radially outward flow of the powder lubricant and to remove a fraction of the heat generated by the relative motion of the damper pads and damper elements.

The bearing outer race is mounted to the damper element, which is in turn, secured by an anti-rotation device to the engine static structure. The damper element is supported on multi-layered curved diaphragms. These diaphragms provide self-centering, radial stiffness, and sealing to retain the powder in the bearing compartment for subsequent recirculation.

BRIEF DESCRIPTION OF THE DRAWINGS

Further objects and advantages of the invention will become apparent from the drawings, wherein.

DETAILED DESCRIPTION OF THE PREFERRED EMBODIMENT

Figure 1:
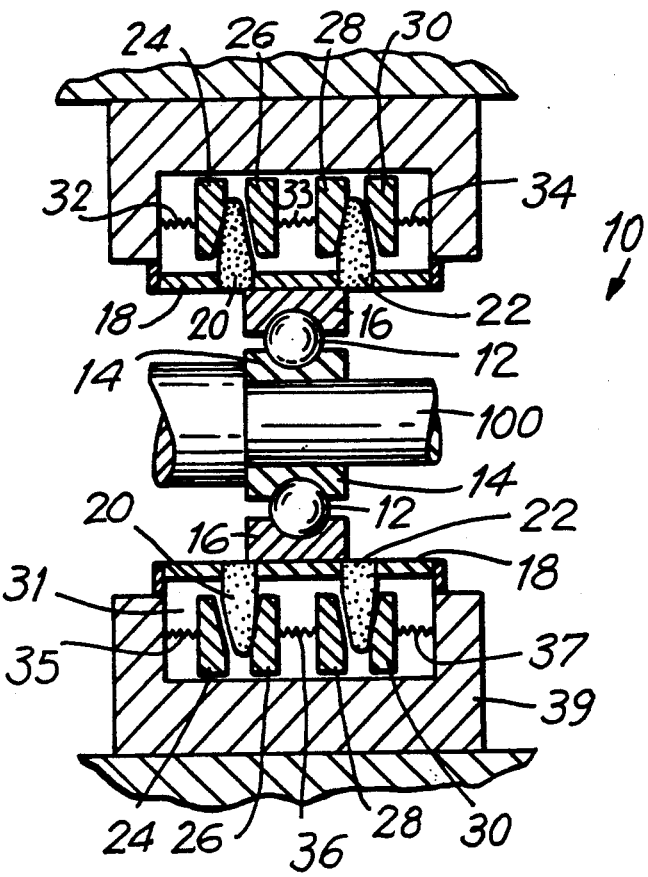
FIG. 1 is a cross-sectional view of a first embodiment of the invention.

Referring now to the drawings in detail wherein like numerals indicate like elements throughout the several views, FIG. 1 is a cross-sectional view of a first embodiment of the apparatus 10 of the instant invention. Shaft 100 is journalled for rotation upon bearings 12 which are engaged between inner race 14 and outer race 16. Outer race 16 includes plate 18 which is fastened to damper pads 20, 22. Damper pads 20, 22 have a radially converging wedge-shaped cross section and are engaged between damping elements 24, 26 and 28, 30, respectively, thereby forming a shearing zone within damper chamber 31 of stator 39. Damping elements 24, 26, 28, 30 are biased against damper pads 20, 22 by springs 32–37. Solid dry powder lubricant such as $TiO_2$ in the 5–20 micron particle size range or other such lubricants known to those skilled in the art is circulated as a quasi-hydrodynamic lubricant between damping elements 24–30 and damper pads 20, 22.

Figure 3:
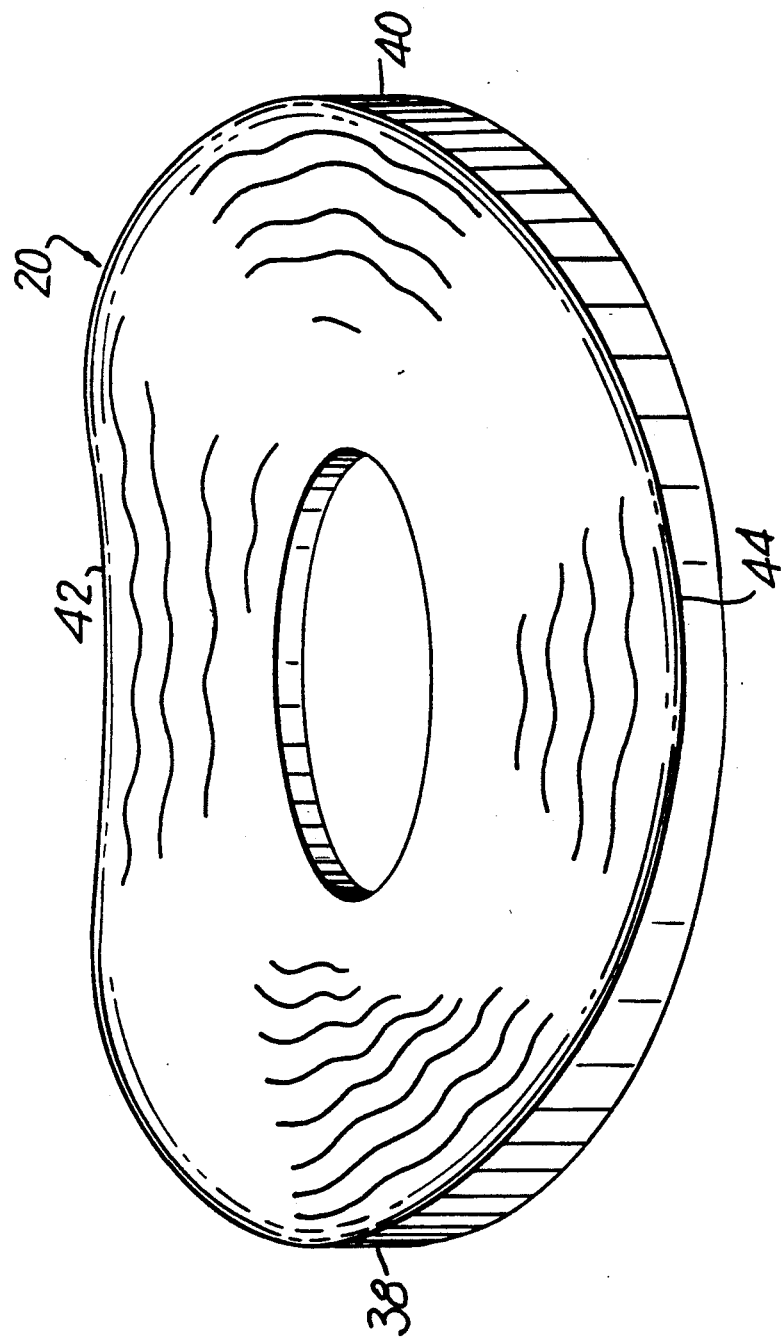
FIG. 3 is a perspective view of the damper pad of the invention.

As shown in FIG. 3, damper pads 20, 22 are circular disks which are tapered in the radial direction and include a circumferential wave on the lateral contacting surfaces shown as hills 38, 40 and valleys 42, 44. This waviness causes the separation of mating surfaces and provides a film gap. The average wave height over the wave half-width is designed to yield 0.001 to 0.002 inches of taper per inch of pad circumferential length. Although the preferred embodiment includes two complete sinusoid-like cycles in the circumferential wave feature, more cycles can be included. This circumferential wave design is important to generate quasi-hydrodynamic action with the powder lubricant and to circulate the powder lubricant thereby removing heat generated by the relative motion between damper elements 24-30 and damper pads 20, 22. Similarly, the wedge shape in the radial direction provides a self-lubrication mechanism and rapid removal of working powder from the damper film gap.

Figure 4:
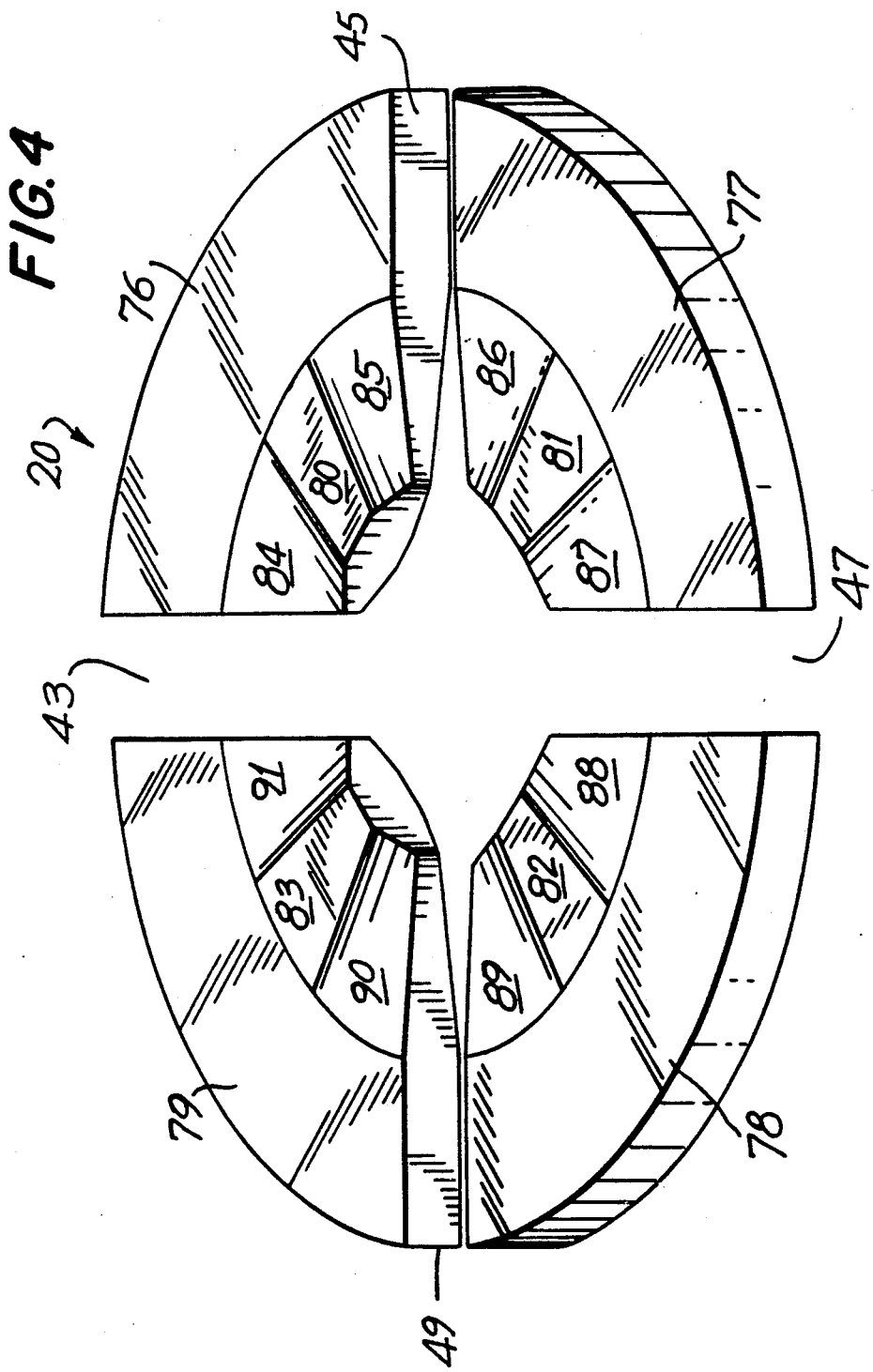
FIG. 4 is a perspective view of an alternative embodiment of the damper pad of the invention, including a multi-partial arc double beveled configuration.

FIG. 4 discloses an alternative embodiment of damper pad 20 (and 22) wherein the circumferential wave formed by hills 38, 40 and valleys 42, 44 is replaced by a double-beveled multi-partial arc configuration formed by radial slots 43, 45, 47, 49 interposed between sections 76, 77, 78, 79. Each section includes a radial bevel 80, 81, 82 or 83 tapering inwardly toward the rotational axis of damper pad 20 from a circumferential area approximately midway between the rotational axis and the outer periphery of damper pad 20. Additionally, sections 76, 77, 78, 79 include lateral bevels 84-91 along radial slots 43, 45, 47, 49. These lateral bevels 84-91 form hill and valley type structures, similar in structure and function to the previously described circumferential wave. This structure enhances the circulation of the powder lubricant in response to motion between the damper pad and the damper element, similar to the function of the circumferential wave. Moreover, radial slots 43, 45, 47, 49 provide a means for the rapid communication of the powder lubricant to the shearing zone between damper pads 20, 22 and corresponding damper elements.

Figure 2:
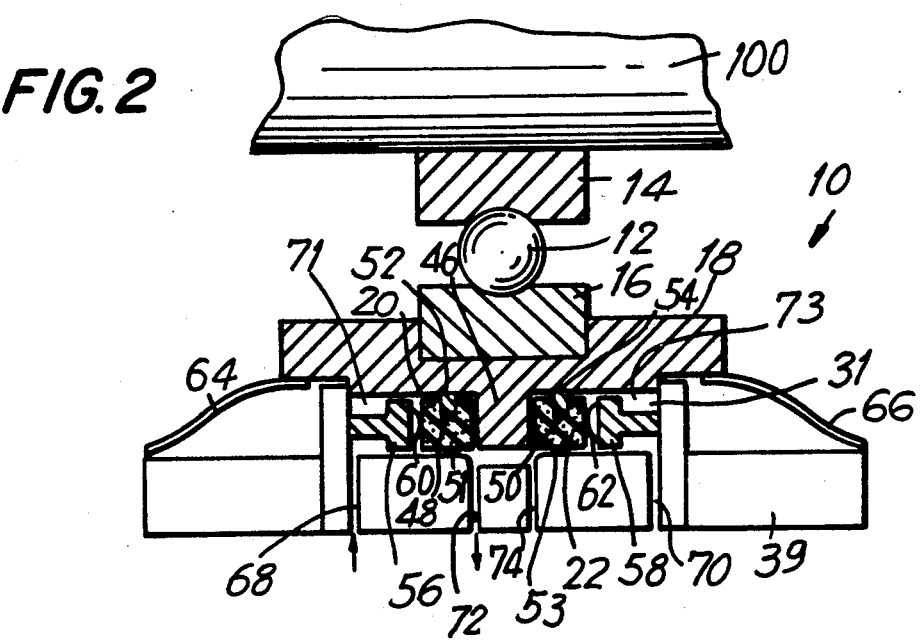
FIG. 2 is a cross-sectional view of a second embodiment of the invention.

FIG. 2 discloses an alternative embodiment of the apparatus 10 of the invention. As in FIG. 1, the apparatus 10 includes shaft 100, bearings 12, inner race 14, outer race 16 and plate 18. Plate 18 includes outward projection 46 against which damper pads 20, 22 abut. Further, damper pads 20, 22 include inner circumferential ridges 48, 50 and are secured radially by piston seal rings 52, 54 which are in turn affixed to plate 18 within damper chamber 31. Damper pads 20, 22 are secured circumferentially by compliant seals 51, 53. Damper pads 20, 22 include the circumferential wave configuration previously described and shown in FIG. 3. Nutating damper elements 56, 58 include inwardly facing compliant alignment mounts 60, 62. Nutating damper elements 56, 58 axially load damper pads 20, 22 thereby forming a shearing zone. Diaphragm centering mounts 64, 66 center plate 18 within damper chamber 31 of stator 38. In addition to the self-centering mechanism, diaphragm centering mounts 64, 66 provide radial stiffness and a seal to retain the powder lubricant in damper chamber 31. Damper chamber 31 is in communication with gas inlets 68, 70. The pressurized air injected into gas inlets 68, 70 serves as a carrier for the dry solid powder lubricant and also urges nutating damper elements 56, 58 against damper pads 20, 22. Carrier air may be additionally fed via several axial air/powder feed slots 71, 73 at the inner diameter of damper pads 20, 22. The pressurized air along with powder lubricant which has absorbed a substantial fraction (as high of sixty percent or more under typical conditions) of the heat generated by the relative motion of damper pads 20, 22 and damper elements 56, 58 exits through outlets 72, 74.

Apparatus 10 can be operated as an active vibration controller by varying the lateral load on the damping pads. Thus a wide range of damping can easily be achieved by increasing or decreasing the lateral load.

Thus the several aforementioned objects and advantages are most effectively attained. Although a number of preferred embodiments of the invention has been disclosed and described in detail herein, it should be understood that this invention is in no sense limited thereby and its scope is to be determined by that of the appended claims.

What is claimed is:

1. A damper arrangement adapted for use in temperatures exceeding 1000° F., comprising circular damper pads abutting damper elements thereby forming a shearing zone, said damper pads including a wavy outer surface, and a dry solid powdered lubricant circulated about said damper pads and said damper elements in response to motion between said damper pads and said damper elements.

2. The damper arrangement of claim 1 further including means for laterally urging said damper elements against said damper pads.

3. The damper arrangement of claim 2 wherein said means for laterally urging includes at least one spring.

4. The damper arrangement of claim 1 further including a stator wherein a damper chamber is formed and wherein said damper pads abut said damper elements within said damper chamber.

5. The damper arrangement of claim 4 wherein said damper chamber is sealed and wherein said powder lubricant circulates therewithin.

6. A damper arrangement adapted for use in temperatures exceeding 1000° F., comprising circular damper pads abutting nutating damper elements thereby forming a shearing zone within a damper chamber formed within a stator, said damper pads including a wavy outer surface, wherein a dry solid powdered lubricant is fed to said damper elements and said damper pads and is circulated within said damper chamber by a carrier gas injected into said damper chamber through at least one inlet port.

7. The damper arrangement of claim 6 further including means for laterally urging said damper elements against said damper pads.

8. The damper arrangement of claim 7 wherein said means for laterally urging said damper elements includes inwardly facing elements on said damper elements which urge said damper elements in response to said gas injected into said chamber through said inlet ports.

* * * * *